United States Patent [19]
Jenkins et al.

[11] Patent Number: 5,374,005
[45] Date of Patent: Dec. 20, 1994

[54] FIBRE COILING

[75] Inventors: Peter D. Jenkins, Woodbridge; Paul F. Wettengel, Ipswich, both of England

[73] Assignee: British Telecommunications public limited company, London, England

[21] Appl. No.: 111,734

[22] PCT Filed: Jun. 22, 1988

[86] PCT No.: PCT/GB88/00488
§ 371 Date: Feb. 17, 1989
§ 102(e) Date: Feb. 17, 1989

[87] PCT Pub. No.: WO88/10230
PCT Pub. Date: Dec. 29, 1988

Related U.S. Application Data

[63] Continuation of Ser. No. 534,300, Jun. 7, 1990, abandoned, which is a continuation of Ser. No. 319,083, Feb. 17, 1989, abandoned.

[30] Foreign Application Priority Data

Jun. 22, 1987 [GB] United Kingdom ............... 8714578

[51] Int. Cl.5 .................................... B65H 51/00
[52] U.S. Cl. ................... 242/361.4; 242/129; 242/171; 254/134.4
[58] Field of Search ............ 242/47, 82, 83, 84, 242/159, 171; 254/134.3, 134.3 FT, 134.4

[56] References Cited

U.S. PATENT DOCUMENTS

| Re. 25,526 | 3/1964 | Blake et al. | 242/82 |
|---|---|---|---|
| 2,227,442 | 1/1941 | De Millar | 242/83 |
| 2,886,258 | 12/1959 | Haugwitz | 242/82 |
| 2,929,577 | 3/1960 | Henning | 242/83 |
| 2,991,956 | 7/1961 | Bruestle | 242/82 |
| 3,054,506 | 9/1962 | Erb | 242/171 |
| 3,120,931 | 2/1964 | Lorenz | 242/83 |
| 3,270,977 | 9/1966 | Tillou, II | 242/82 |
| 3,272,455 | 9/1966 | Sternberg et al. | 242/83 |
| 3,559,917 | 2/1971 | Mackie | 242/159 |
| 3,599,891 | 8/1971 | Stone | 242/82 |
| 3,608,710 | 9/1971 | Pugh | 254/134.3 R X |
| 3,750,974 | 8/1973 | Dibrell | 242/47 X |
| 3,785,137 | 1/1974 | Karlson | 242/159 X |
| 3,843,072 | 10/1974 | Rayfield | 242/82 |
| 3,968,877 | 7/1976 | Mattis | 242/159 X |
| 4,080,772 | 3/1978 | Chambley et al. | 242/82 X |
| 4,151,965 | 5/1979 | Manabe | 254/134.3 FT |
| 4,172,375 | 10/1979 | Rushforth et al. | 242/82 X |
| 4,535,946 | 8/1985 | Thevenon | 242/82 X |
| 4,553,707 | 11/1985 | Henrich | 242/159 X |
| 4,596,381 | 6/1986 | Hamrick | 254/134.4 |
| 4,691,896 | 9/1987 | Reeve et al. | 254/134.4 |
| 4,773,607 | 9/1988 | Missout et al. | 242/47 |
| 5,165,662 | 11/1992 | Jenkins | 254/134.4 |

FOREIGN PATENT DOCUMENTS

| 039140 | 4/1981 | European Pat. Off. |
|---|---|---|
| 0039140 | 4/1981 | European Pat. Off. |
| 102077 | 3/1984 | European Pat. Off. |
| 108590 | 5/1984 | European Pat. Off. |
| 1581707 | 9/1969 | France |
| 2574058 | 6/1986 | France ............... 242/47 |
| 1082215 | 5/1960 | Germany ............ 242/82 |
| 2202177 | 7/1973 | Germany |
| 2552890 | 4/1985 | Germany |
| 57-126356 | 8/1982 | Japan |
| 59-217565 | 12/1984 | Japan |
| 2081764 | 2/1982 | United Kingdom |

Primary Examiner—Daniel P. Stodola
Assistant Examiner—Michael R. Mansen
Attorney, Agent, or Firm—Nixon & Vanderhye P.C.

[57] ABSTRACT

A technique for handling filamentary material, specially optical fiber packages, in which the filamentary material is coiled into an annular pan in a series of turns each of which is offset from preceding turns. The turns each contain 360 degrees of torsion which is relieved when the filamentary material is paid out from the pan. A rosetting head for laying the pattern sequence is located in the center of the annular pan.

16 Claims, 7 Drawing Sheets

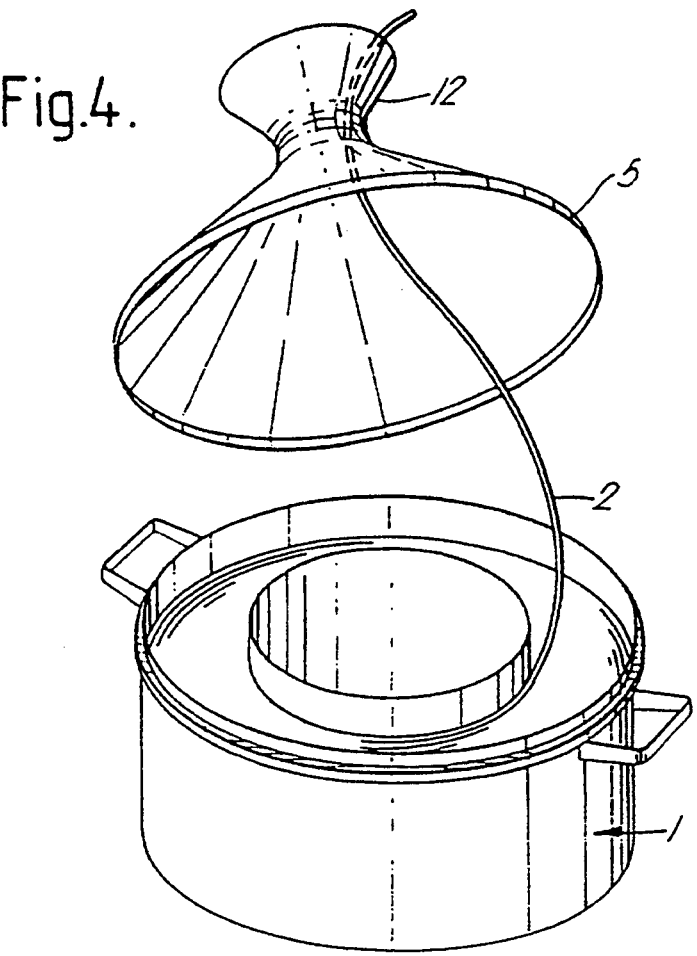
Fig.4.
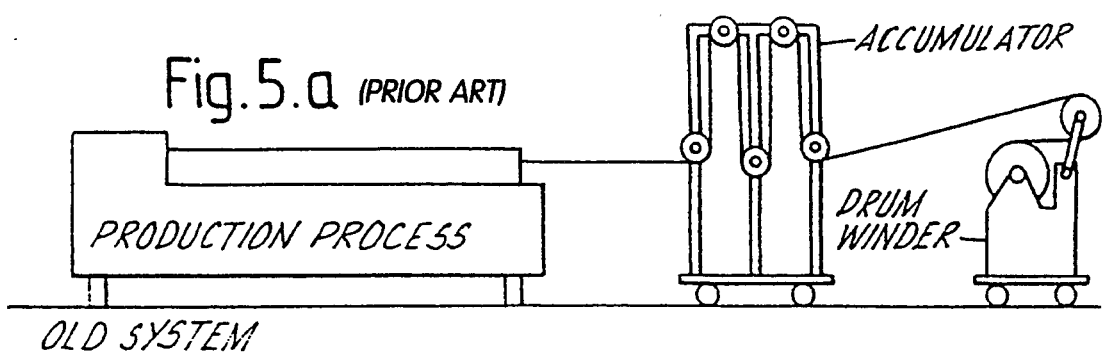
Fig.5.a (PRIOR ART)
PRODUCTION PROCESS
ACCUMULATOR
DRUM WINDER
OLD SYSTEM
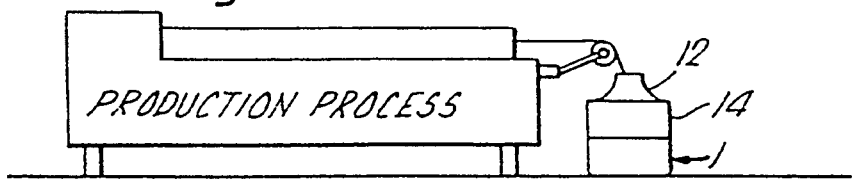
Fig.5.b
PRODUCTION PROCESS (WINDING-IN)  (PAYING-OUT)

FIBRE COILING

This is a continuation of application Ser. No. 07/534,300, filed Jun. 7, 1990, now abandoned, which in turn was a continuation of Ser. No. 07/319,083 filed Feb. 17, 1989, now abandoned.

This invention relates to coiling and storage of filamentary material and especially of optical fibres and optical fibre packages, and to installation systems for optical fibres.

Published European Patent application 108590 describes an apparatus and method for installing optical fibres in ducts by propelling the fibre along the duct by virtue of viscous drag of an injected gaseous propellant. In such installation the length of duct along which a fibre can be propelled or 'blown' depends upon the number of bends in the duct but typically may be 500 to 800 meters. It is often the case, however, that a much greater length of continuous fibre needs to be installed and in this instance several ducts are placed in series and the additional fibre for subsequent ducts is blown through the first duct and wound on to a drum. Once the fibre for the subsequent ducts has been blown through the first duct it is then blown through the next duct, and so on. However, before the second and subsequent blowing stages can be performed it is necessary to fleet the fibre from the drum to free the end and introduce the fibre to the duct in the correct manner. This means that between each blowing stage there is a delay while the fibre is fleeted and also both reeling and fleeting equipment is required.

It is also found that during fibre blowing installation the fibre package tends to move into the duct at varying speeds. When the fibre package has to be unwound from a reel the inertia of the reel presents significant problems when subject to frequent changes in feed rate, the reel either retarding the fibre or continuing to unwind at too great a rate giving rise to loose turns. One way of preventing the latter problem is to incorporate a friction brake on the reel, but this has the disadvantage of increasing tension on the fibre package making it more liable to damage should it rub on or be bent around an object in its path.

One of the objects of the present invention is to provide a system that enables optical fibre to be blown into a duct directly from a coil.

When a filamentary material is laid in a coil, then unless the container into which the filamentary material is laid is rotated each turn of the coil contains 360 degrees of torsion. It has previously been generally recognized as disadvantageous to have containers of filaments with stored torsion: in the case of metal filaments they can be springy and unmanageable and with Optical fibres it has been recognized, for example as in EP 0039140, as a potential contributor to entanglement. Various techniques have been devised to prevent this storage of torsion in which the container or platform on to which the coil is laid is rotated in order to reduce or eliminate the torsion. Such a system is described in EP 0039140. However when filamentary material is stored in a coil without torsion, or with less than 360 degrees of torsion per turn, simple pulling of the turns to unwind the coils reintroduces torsion unless the container or platform is again rotated, this time in the opposite direction to that in which it was rotated during coiling. For use in fibre blowing it is undesirable to have torsion in the fibre that is being installed in the duct as this may lead to greater lateral fibre movement and reduce blowing distances. This means that equipment for container rotation would be required both for winding and unwinding, and especially the latter can be inconvenient for in-field use. There is also the disadvantage that rotating the container can suffer from inertial problems the same as those previously mentioned for reels.

Accordingly the invention provides an apparatus for forming a coal of filamentary material, the apparatus comprising an annular container with an outer side wall and an inner wall substantially concentric with the outer side wall, and means for distributing the filamentary material into the container in which the filamentary material is laid in the annular container in a sequence of turns about the inner wall, each turn having 360 degrees of torsion and being offset with respect to adjacent turns and the container is maintained rotationally static.

The invention also provides a container of filamentary material comprising an annular container in which the filamentary material is laid in a sequence of turns about an inner wall of the container, the turns being offset with respect to adjacent turns and each turn having 360 degrees of torsion.

A further aspect of the invention resides in a technique for coiling a filamentary material comprising locating a first section of a continuous filament in a container having an inner side wall located within an outer side wall and passing the filament over a rotatable carrier, rotating the filament carrier about a movable axis located within the inner wall so that the filament is progressively laid in the container in a sequence of turns about the inner wall, each turn being offset with respect to the preceding turn.

The invention is now described by way of example with reference to the following drawings in which:

FIG. 4 shows an exploded view of a fibre package threaded through a funnel lid for paying out;

FIGS. 5a and 5b show, respectively, a prior art system for optical fibre storage after production and the system according to the invention;

Figure 1:
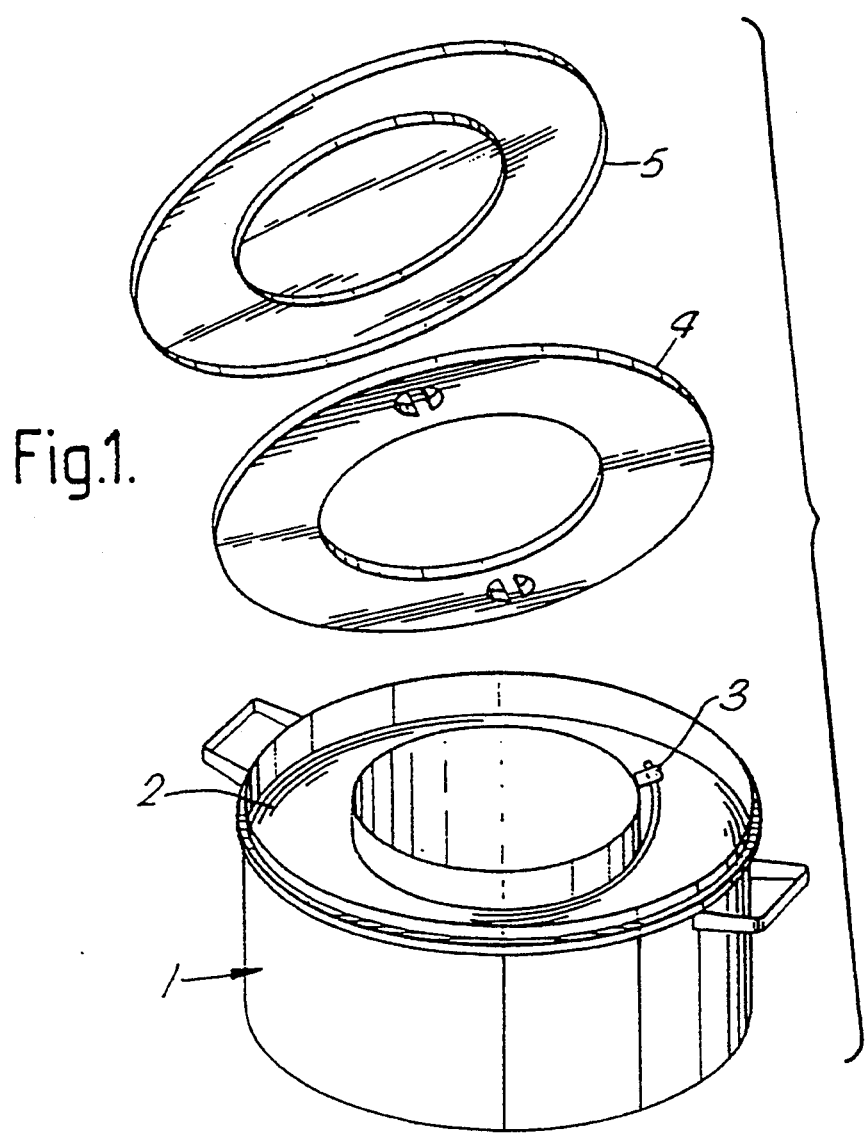
FIG. 1 is an exploded view of a container including coiled fibre.

In FIG. 1 a container in the form of an annular pan 1 contains a coil of optical fibre package 2, the ends of which are marked with tabs 3 (only one shown). The fibre package 2 consists of a plurality of fibres encased in low density coating such as that described in EP 108590, although other suitable filamentary components or packages may also be handled in a way similar to that described herein for optical fibre packages. In particular it is envisaged that non packaged optical fibres may be stored in coils as described herein. The fibre package can be loaded into pans at the point of production and stored, for this purpose a retaining ring 4 and lid 5 are provided. Pans of 500 mm external diameter, 300 mm internal diameter and 250 mm depth may typically hold between 2 and 3.5 km of fibre package that has a diameter of 2 mm, the length depending upon the packing density.

When the fibre package is to be used it can conveniently be delivered to the point of use in the pan and installed directly from the pan. Coiling fibre package into another pan, for example after installation through the first stage of a multi-stage system, may also be performed conveniently in the field.

Figure 2:
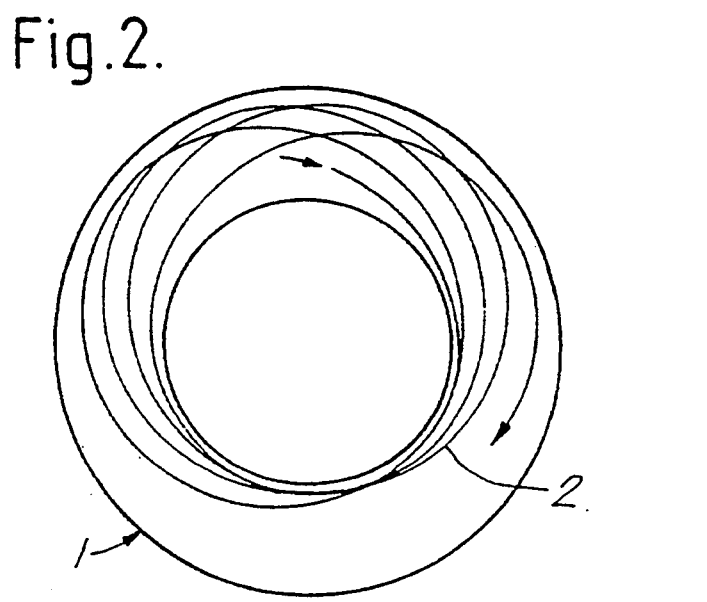
FIG. 2 shows a rosetting pattern for coiled fibre.
Figure 3:
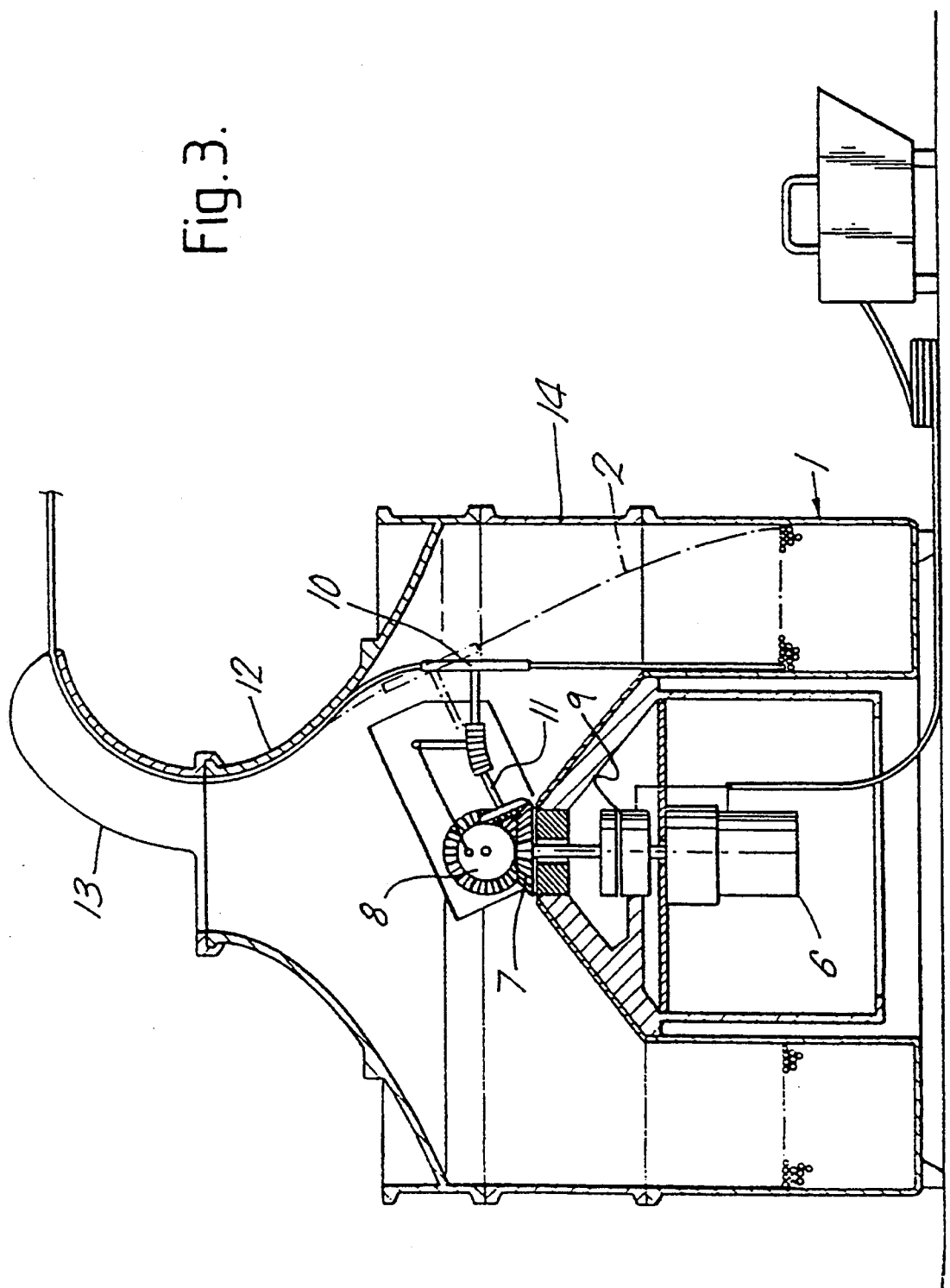
FIG. 3 shows a fibre rosetting head in position in a container.

FIG. 2 shows the preferred rosetting pattern in which the fibre package is laid in the pans by the technique shown in FIG. 3. The rosetting pattern is a series of turns each of which is positioned eccentrically with respect to the pan centre and angularly incremented with respect to the previous turn. A rosetting head comprises a constant speed motor 6 which drives a drive gear 7 and rosetting gear 8 via a slipping clutch 9 that provides constant torque and variable speed. A fibre package feed wheel 10 is provided on the end of an arm 11 which is given round and offset by the gears to create the rosetting pattern. As each turn of the rosette is laid it receives 360 degrees of torsion as a consequence of being fed in by the rotating arm. The fibre package is thus stored with torsion in each turn. The rosetting head and motor are designed so that the motor housing fits removable within the centre ring of the pan annulus with the arm 11 mounted above the level of the sides. To protect the fibre package and mechanism a lid incorporating a funnel or guide is placed over the pan. In FIG. 3 the lid has a central funnel 12 and a guide extension 13, and is supported by a spacer ring 14. This whole lid assembly may be made integrally or in separate parts, but it is convenient for the lid 5 to incorporate a funnel 12 and be reversible so that for Storage the lid is located with the funnel projecting inwardly into the centre of the pan annulus, the lid being inverted to the position shown in FIG. 3 with the funnel outwardly for paying out and winding. In the case of paying out, the spacer ring 14 is not necessary because the rosetting head is removed and the fibre package is simply pulled out of the pan. FIG. 4 shows the fibre package 2 threaded through a funnel lid, following this threading the lid is positioned on the pan and the fibre package pulled out, for example by blowing installation.

Figure 6A:
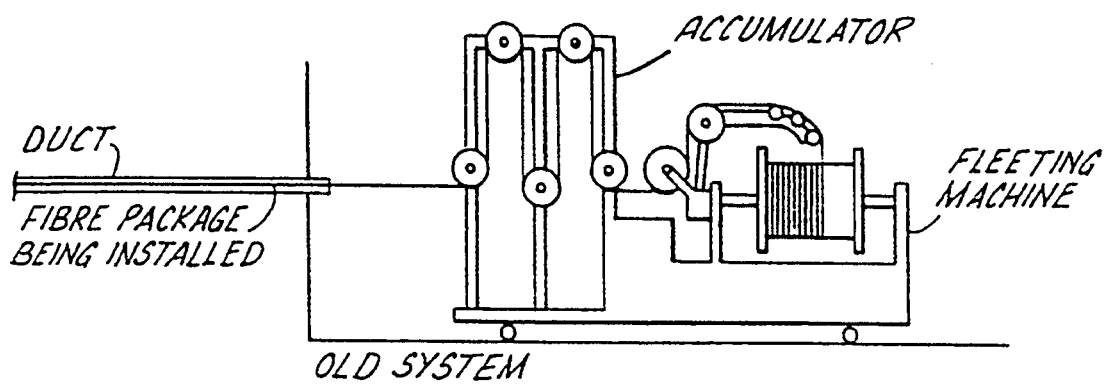
FIGS. 6a and 6b show, respectively, a prior art system for fibre coiling during installation and the system according to the invention.
Figure 6B:
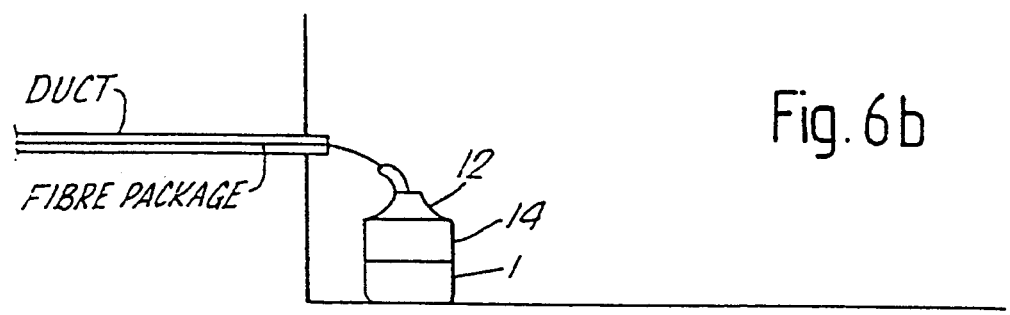

FIG. 5a illustrates the prior art system with respect to the system of coiling using the rosetting head and pans (FIG. 5b). FIG. 6a shows the prior art system of paying out an intermediate stage of a multi-stage installation process, this stage having been preceded by a winding process for transferring the fibre package from a take up drum to a fleeting machine. FIG. 6b shows the relative simplicity of the rosetting head and pan method.

Figure 7A:
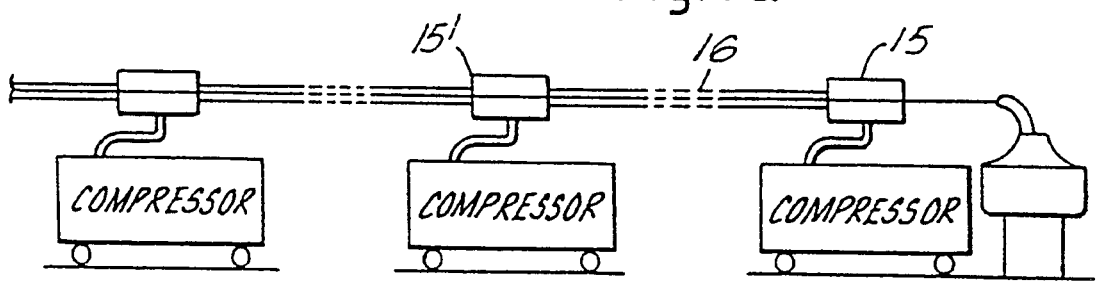
FIGS. 7a and 7b show alternative fibre blowing methods utilizing the invention.
Figure 7B:
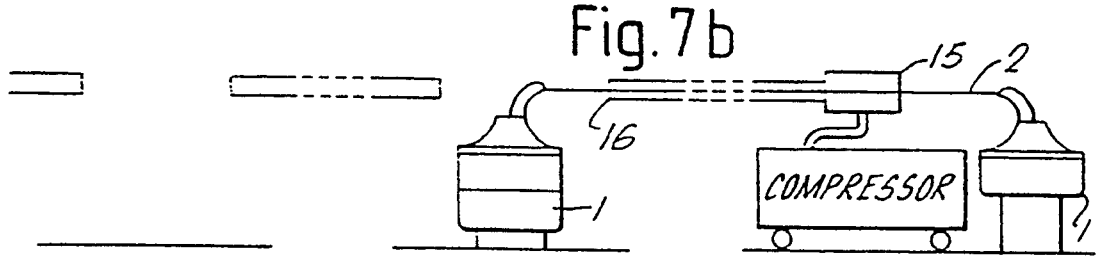

During fibre blowing installations the fibre package 2 is fed directly from the pan to the blowing head. Two systems are shown in FIGS. 7a and 7b where the continuous length of fibre package to be installed is greater than twice the maximum blowing distance, which in general means installations exceeding 1000 meters. In FIG. 7a tandem blowing is utilised, the fibre package being fed into a first blowing head 15 and blown for, say 500 meters at which point the duct 16 is vented and the fibre package proceeds directly into another blowing head 15'. The installation depicted in FIG. 7b is interrupted after each 500 meters or so of duct and the fibre package is rosetted into a pan 1 as it emerges from the far end of the duct 16.

Figure 8:
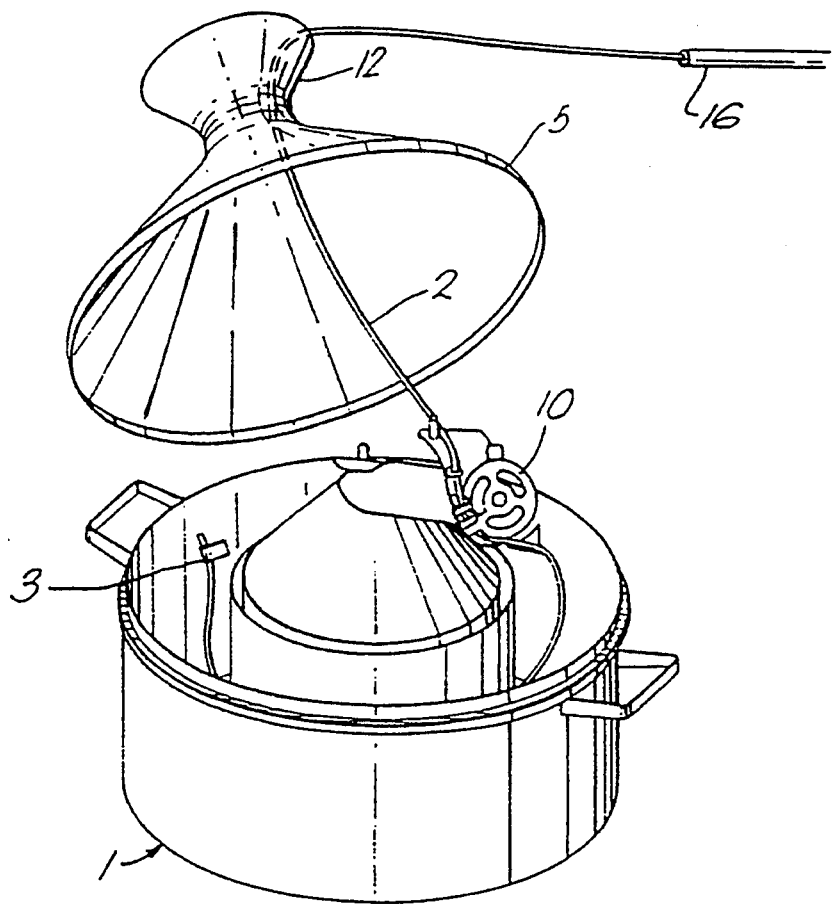
FIG. 8 shows a rosetting head threaded to coil optical fibre in a container at an intermediate stage of coiling in a fibre blowing installation.
Figure 9:
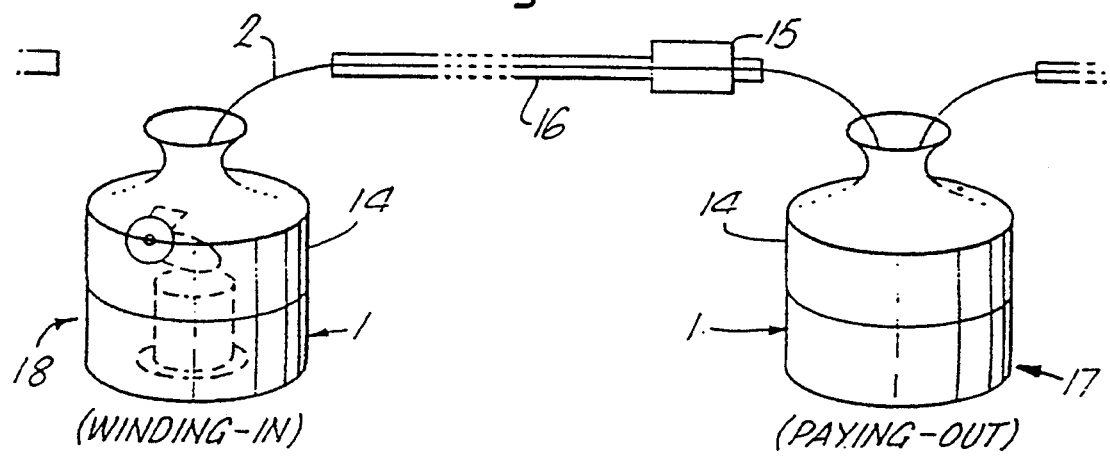
FIG. 9 shows two adjacent stages in a stage-by-stage fibre blowing installation utilizing the invention.

FIG. 8 shows how the pan and rosetting head are set up after the leading end of the fibre has been received at the far end of the duct 16. While the head is set up it will usually be necessary to suspend blowing through the duct 16. After setting up the head, the leading end of the fibre is flagged and placed in the bottom of the tray, the rosetting commenced and the blowing through the duct recommenced. FIG. 9 illustrates two adjacent stages 17 and 18 during a multi-stage installation, the fibre package being paid out from stage 17 and wound in at stage 18. When this is completed stage 18 will be paid out to the subsequent stage after the leading end has been recovered as described later.

Two stages (usually the first two) in an installation may be achieved without a winding stage even for non-tandem blowing. In this instance the pan of fibre package is located between the first and second duct stages. The uppermost end of the fibre package is paid out and blown along the first duct stage (which may be the end of the installation or be a winding stage). When the requisite length has been blown through the first duct, the blowing operation is stopped and the second end of the fibre package (which is at the bottom of the pan) is located and that end is blown through the second duct (again to an end of the installation or a winding stage). The operation of locating the second (bottom) end of the fibre package is the same as for locating the leading end after a winding stage and is described next.

Figure 10:
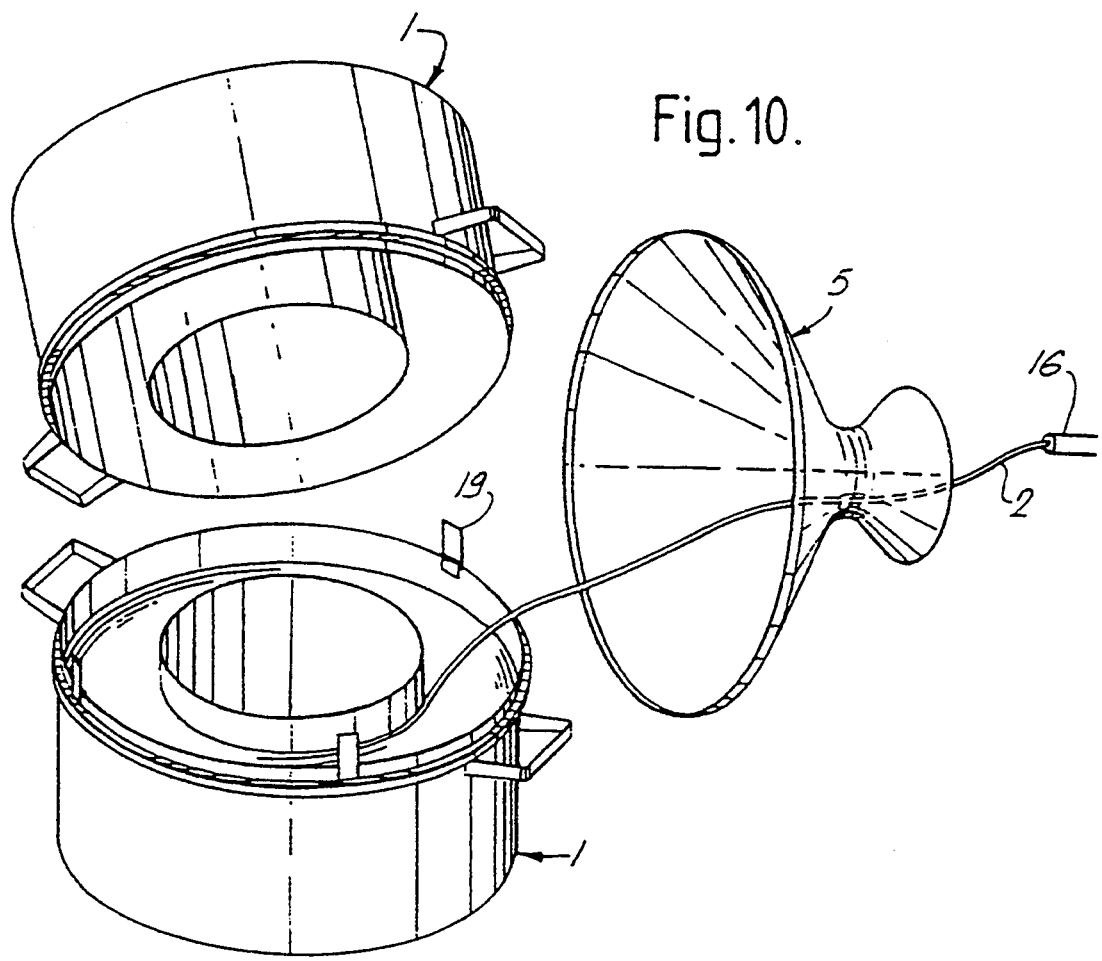
FIGS. 10 to 12 show the stages of freeing the fibre end for a second or subsequent blowing stage.
Figure 11:
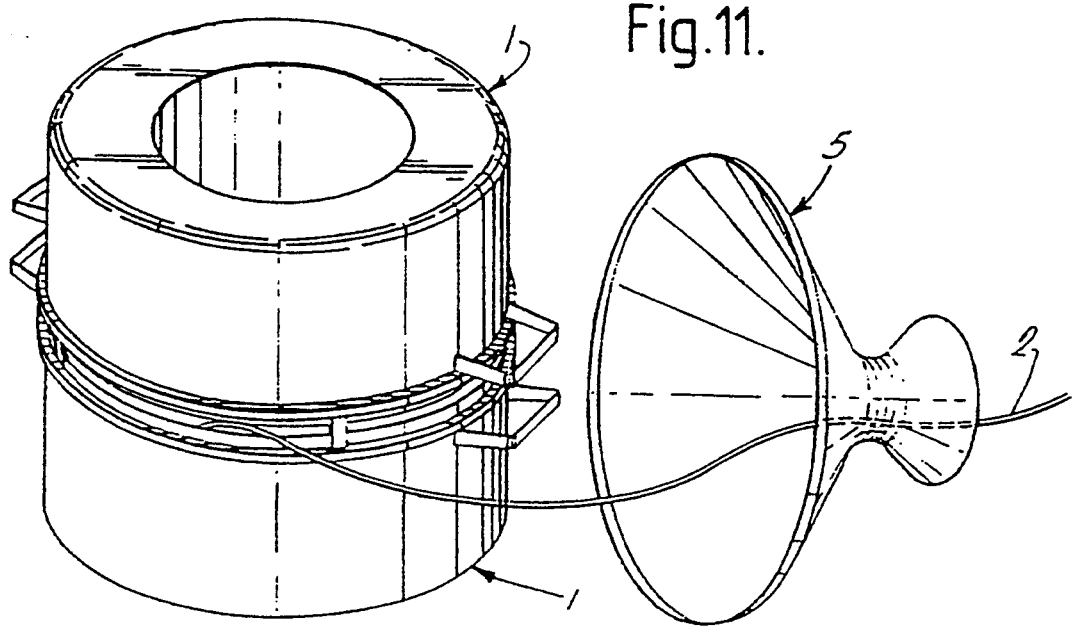
Figure 12:
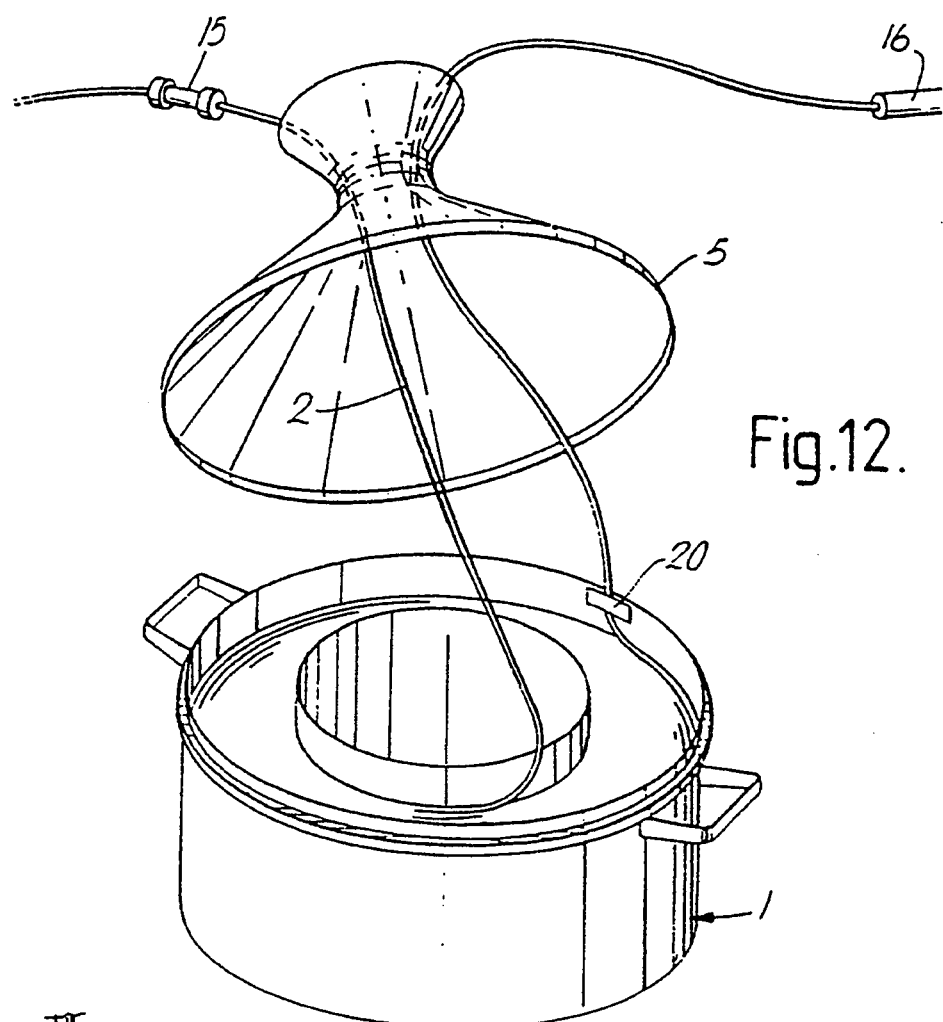

FIGS. 10, 11 and 12 illustrate a sequence of steps to free the leading end of a fibre package that is located at the bottom of the wound fibre package in a pan having a fixed bottom. One end of the fibre package is at a remote location of the installation either having been blown there from the top of the pan or having been retained at the remote location while the remainder of the fibre package was blown through a duct. Thus the continuous length of fibre package 2 extends from duct 16, through a funnel lid 5 to the coil in the pan. The lid is removed from the tray and carefully laid to one side and the rosetting head (if winding has just taken place) is carefully removed by freeing the fibre package from the feed reel. Several spacer lugs 19, for stability at least three, are then located on the sides of the pan, and a second empty pan is located upside down on top of the lugs 19. The pans and lug assembly are then inverted to decant the coiled fibre package into the empty pan so that the end of the fibre previously underneath is now exposed on the top of the coil. This end is then fed through the funnel lid and into the blowing head for the next stage. To help prevent interference with the active fibre package 2, it is found useful to lightly tape the fibre package extending from duct 16 to the side of the pan at the location referenced 20. The pan spacers are removed and the funnel lid replaced.

It will be realized that the pan spacers 19 serve to prevent the fibre package that hangs over the edge of the pan from beings quashed between the pans during the inversion procedure. The lugs may be separate components or be attached to the pans, and they may be modified to function also as catches or clips for the lid. Alternative ways of preventing the fibre package from being squashed can be used. For example, a slot for the fibre package may be provided in the side wall of the pans or a tubular spacer may be inserted into the centre of the pans. The tubular spacer is particularly preferred because it enables free passage for the fibre all around the outside of the pan. A suitable form of tubular spacer comprises a tube of external diameter slightly less than the internal diameter of the inner wall of the pan 1 so that it will fit within the inner walls of the upper and lower pans, a central portion of the tubular spacer having an enlarged diameter so that it will not enter within the inner walls and will hold the pans apart.

Figure 13:
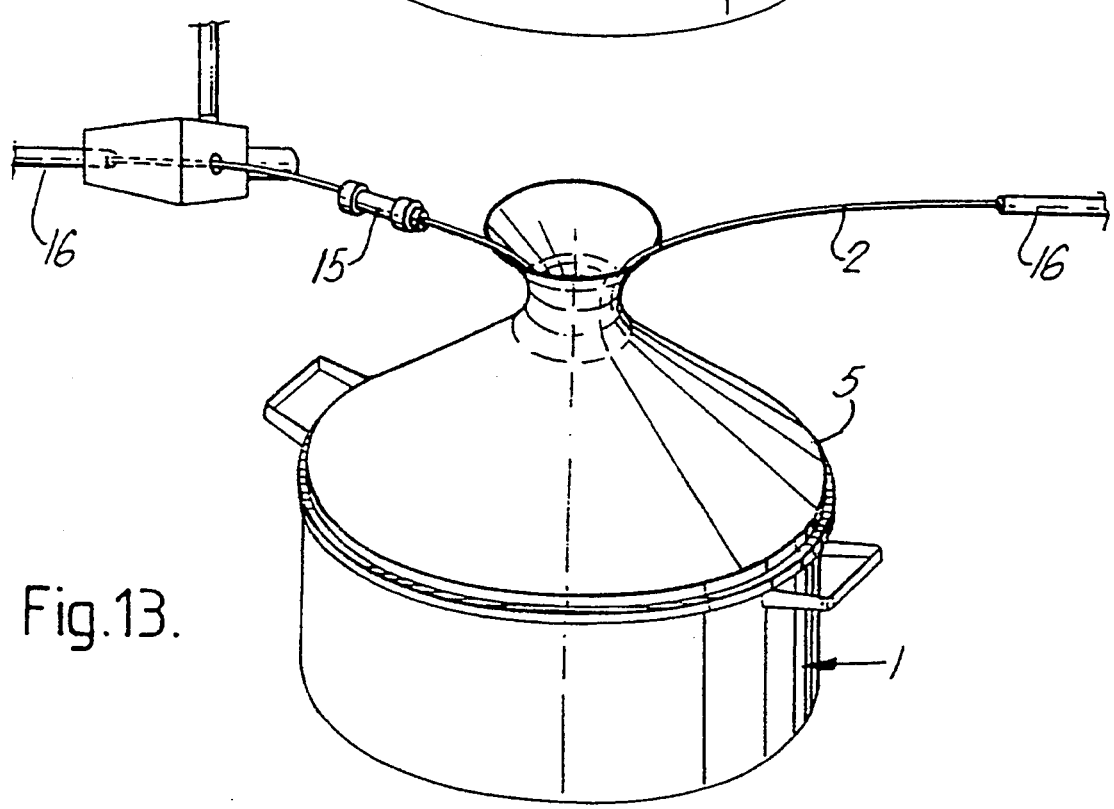
FIG. 13 shows the last stage of paying out from a container.

FIG. 13 shows the last section of fibre package emerging from the top of the funnel lid when both ends of the package are installed in ducts. Pulling the turns directly out of the pan causes the 360 degrees torsion in each turn to be relieved so that the last turn pulls out freely and the installed fibre package is free of torsion. The taping of the fibre package at point 20 should be sufficiently light for the fibre package to pull free without damage. In the event that the taping is too strong sensors on the blowing head interrupt the blowing so that the lid can be lifted and the tape removed.

Although the winding arrangement has been described with regard to storage after production and during blowing operations, the technique is also applicable as an alternative to reeling on other installation procedures, and the filament need not be a fibre blowing package. A further advantage of the invention is that in paying out from a pan, the rate of paying out closely follows the demand rate and therefore the problems encountered with reel inertia or moving containers do not occur. The filament is therefore relatively free from-tension and in the event of the filament being a fibre, this makes it far less liable to damage.

In the event that the continuous length of filament being handled is greater than that which can be wound into a single pan (which can of course be provided in a variety of sizes), a continuation pan can be loaded in the same way as described with respect to a single pan, except that there is no free end to lay in the bottom of the pan and a free passage for the length of fibre package extending from the base of the continuation pan to the previous pan is required. This free passage may be provided by taping the fibre package to the side of the pan and/or lid out of the way of the rosetting head.

When a length of fibre is wound into two (or more) adjacent pans in this way it is possible to simultaneously access both ends of the fibre by freeing (through inversion) the end of the fibre laid at the base of the first pan, the second being available at the top of the second end (or last filled) pan. Each end may then be introduced to a respective duct and blown in, thereby enabling simultaneous installation of two adjacent stages of ducting. Starting at a central location and utilising tandem blowing (booster injection of compressed gas, preferably preceded by venting) this enables installation of several kilometers of fibre in a single operation.

Instead of decanting wound fibre from one pan to another it is also possible to provide a pan with an openable base, thus enabling inversion and access to the covered end without decanting: such a pan could, in some instances and with suitable modification, be mounted with the turns in a vertical plane and accessed from each side for paying out.

With the preferred rosetting pattern and a 2 mm fibre package, it is preferred to load the pans with the offset increment between turns being such that 100 turns provides a 360 degrees repetition cycle. This is relatively loose packing but is less likely to result in tangles on rapid paying out, which can occur if a turn that is being paid out lifts an adjacent turn. Maximum packing density is of the order of 200 turns per 360 degrees repetition cycle.

Although the technique and apparatus has been described in relation to optical fibre packages and fibre blowing, it is applicable in other situations. One particular advantage of the invention is .that the ends of the filament or line are stationary and thus they can be connected to a transmission system so that the line can be monitored, for example, during paying out or communication maintained to remote moving apparatus to which a line is being paid out or wound in. This is particularly relevant for optical fibre systems where communication through moving terminals via split rings is not possible.

We claim:

1. Apparatus for forming a coil of filamentary material, the apparatus comprising:
    an annular container having a storage cavity defined by an outer side wall, and an inner wall spaced from and substantially concentric with said outer side wall, said container having a cap member attached thereto and positioned over the inner and outer walls, the cap member having an opening through which the filamentary material passes during the formation of the coil,
    a filament carrier, rotatable about an axis passing therethrough,
    and drive means for rotating said filament carrier, wherein both the filament carrier and the drive means are mounted:to and within said annular container below the cap member, said drive means rotating said filament carrier so as to distribute said filamentary material into the container in which the filamentary material is laid in the storage cavity of the annular container in a sequence of turns about the inner wall, each turn having 360 degrees of recoverable elastic torsion and being offset with respect to adjacent turns while the container is maintained stationary.

2. Apparatus according to claim 1 further including motive means to drive said rotatable filament carrier within the region defined by said inner wall.

3. Apparatus according to claim 2 wherein said motive means is part of an assembly which is adapted to receive said container, the motive means fitting removably within the region defined by the inner wall of said container.

4. Apparatus according to claim 2 wherein said rotatable filament carrier is readily demountable from said motive means.

5. The apparatus of claim 1 further including a filamentary material supply means comprising a second container for supplying said filamentary material, said second container having a substantially annular configuration with a top, a bottom, an outer sidewall, a substantially concentric inner sidewall, and a central cavity within the region bounded by said inner sidewall, said cavity defined by a through bore extending between the top and bottom of the inner sidewall, said second container further comprising a supply of optical fibre material laid in a sequence of turns about said inner sidewall of said second container, the turns being offset with respect to adjacent turns and each said turn having 360 degrees of recoverable elastic torsion.

6. A container according to claim 5 in which the filamentary material is an optical fiber and the optical fiber turns comprise a sequence of respectively eccentric circles.

7. Apparatus according to claim 1 wherein said rotatable filament carrier comprises a rotatable wheel assembly mounted at the distal end of an oscillating arm.

8. Apparatus according to claim 7 wherein said rotatable wheel assembly comprises a drive wheel and means to hold the filamentary material against the drive wheel whereby rotation of the drive wheel serves to advance the filamentary material to create the sequence of turns.

9. Apparatus according to claim 1, further comprising a funnel-shaped cap member which fits the top of the container and through which the filamentary material passes during the formation of the coil.

10. Apparatus according to claim 1, wherein said drive means is rotatable.

11. Apparatus according to claim 1 in which the axis about which said filament carrier rotates is progressively moved so that the turns are laid eccentrically and adjacent turns have their centres offset.

12. Apparatus according to claim 11 in which said filament carrier is mounted on a series of gears.

13. Apparatus according to claim 1 in which the turns are circular.

14. A method for coiling a continuous filamentary optical fiber member comprising the steps of:
   providing an annular container having an inner side wall located within and spaced from an outer side wall and a cap member over the inner and outer side walls, the cap member having an opening,
   passing the optical fiber member though the opening into the container and over a rotatable filament carrier,
   energizing driving means located within said inner side wall of the container so as to rotate the filament carrier about an axis passing through said filament carrier,
   moving said axis within the container so that the optical fiber member is progressively laid in the container in a series of turns between the inner and outer side walls while the container is kept substantially stationary, so that each said turn is offset with respect to the preceding turn and contains 360 degrees of recoverable elastic torsion.

15. A method according to claim 14 wherein said step of moving said axis includes progressively laying the series of turns in a sequence of respectively eccentric circles.

16. Apparatus for storing an optical fiber member in a wound coil from which it can be efficiently unwound and blown into a duct, said apparatus comprising:
   an annular container having an inner wall, an outer wall, and a cap member on the container over the inner and outer walls;
   a fiber member carrier located below the member cap within said container and rotationally mounted with respect to said container for forming and depositing successive turns of said optical fiber member within said container; and
   means for rotating said carrier with respect to said container during formation and deposit of each of said turns so that each such turn retains substantially 360 degrees of recoverable torsion while stored in said container.

* * * * *